Nov. 2, 1937.  A. C. FISCHER  2,097,972
PLANT COVERING
Filed Oct. 1, 1934
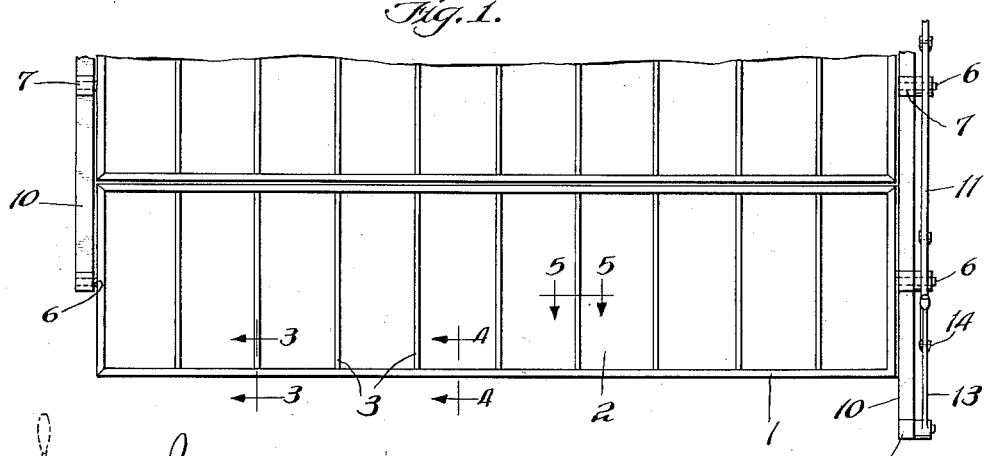
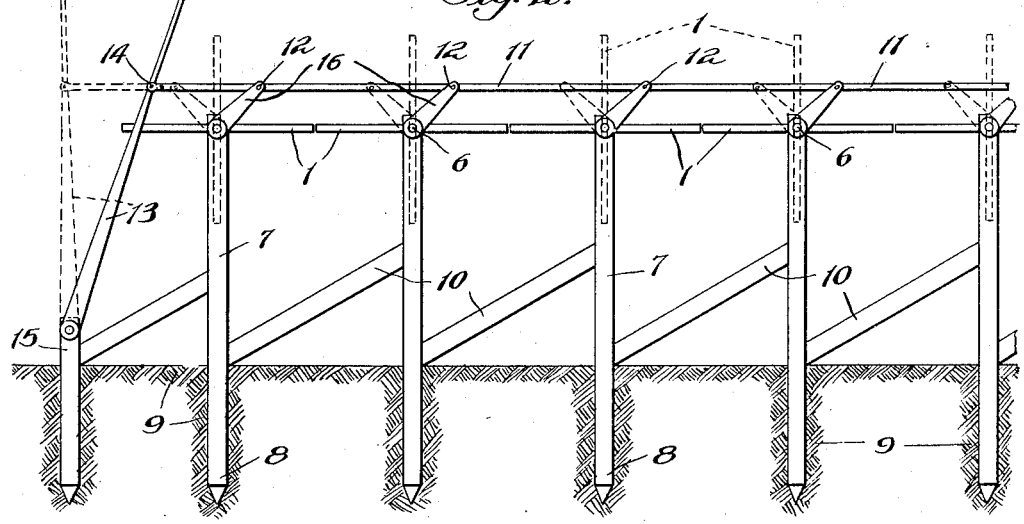
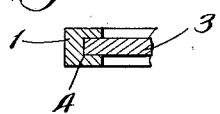
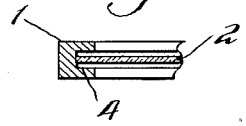
INVENTOR.
Albert C. Fischer
BY Albert F. Robinson
ATTORNEY.

Patented Nov. 2, 1937

2,097,972

UNITED STATES PATENT OFFICE 2,097,972

PLANT COVERING

Albert C. Fischer, Chicago, Ill.

Application October 1, 1934, Serial No. 746,339

7 Claims. (Cl. 47—29)

This invention relates to a plant covering, particularly pertaining to a covering which may be readily assembled and disassembled for protecting plants against early frosts. While the device may be more or less permanent in character, it is especially designed for covering large or small areas and thus may be made up for temporary as well as permanent use and installation.

The invention accordingly consists in the features, combinations and arrangements of parts which will be exemplified in the construction hereinafter described or claimed for carrying out the above stated object and such other objects as will hereinafter appear in the description.

The aim of the present invention is to provide a roof, siding or framework for covering plants. It may be used in greenhouses, hotbeds and other small and large areas to protect the plants from damaging frosts. Ordinarily in propagating early plants and also in the late season before the plants are hardened, there is danger of frosts, and the present invention aims to serve as a more or less temporary or permanent protecting device, and during these periods may be readily assembled and disassembled, or if desired may be of a more permanent character and left in place from season to season. The structure of the device is such that the covering may be manipulated to protect the plants during inclement or frosty weather but in good weather may be opened to expose the plants to the full benefit of the atmosphere.

For a better understanding of the invention reference may be made to the accompanying drawing, in which Figure 1 is a top plan view of a section of a covering embodying the present invention;

Figure 2 is a side elevation of Figure 1 partly in cross section;

Figure 3 is a detailed view taken on line 3—3 of Figure 1;

Figure 4 is a detailed view taken on line 4—4 of Figure 1;

Figure 5 is a detailed view taken on line 5—5 of Figure 1; and

Figure 6 is a modified form showing the glass frame section arranged in overlapping relation.

Referring specifically to the drawing numeral 1 designates a frame member having mounted therein a series of transparent windows, such as glass 2, separated by spacing strips 3. The ends of the window sections 2 are adapted to be received in the recesses 4 of the frame member 1. One or both sides of the frame member may be made so that it is readily disengaged for insertion or removal of the window sections 2 if any of same should become broken. Any number of window sections may be included in the frame and these may be of any size. In the structure of the frame it will be apparent that they are readily assembled and disassembled without any fastening means other than the frame. The spacing strips 3 may be of any material but are preferably of some such material as rubber or plastic material, molded into shape with opposite grooves 4 and 5 which are adapted to receive the edges of the window sections. The spacing strips are of such character that they provide for any contraction or expansion and also protect the windows from being broken. The opposite ends of the frame 1 are provided with trunnions 6, whereby said frame may be pivotally mounted upon supports or supporting elements 7. One frame member is preferably mounted upon individual supports, whereby same is a unit and may be associated with other similarly constructed units. As a result of this construction any number of units may be associated, as shown in Figures 1 and 2, to cover any given area. These supports 7 are preferably secured by having one end 8 driven into the ground 9, but the invention is not limited to any particular manner in which the frame members are supported and any desirable manner of support is suitable, whether it be driven into the ground surface 9 or rests thereupon. The supports 7 may be further braced in place by braces 10.

In order to manipulate the window frames to an open or closed position, as indicated by the dotted and full line positions in Figure 2, each frame member may be provided at one end with an arm 16, pivotally attached to a rod 11 at 12. One end of the rod 11 is pivotally attached to an arm 13 at 14 and this arm may be actuated to open and close the frames. The lower end of the handle 13 may be pivoted to any fixed support, such as 15. When the window frames are in closed position, as shown by the full lines in Figure 2 the edges of the frame are in substantial abutting relation, there being only enough clearance between the ends of the frames to permit them being pivoted to open position as shown by the dotted lines. Thus the plants which are beneath the window frames are securely protected from the full atmosphere or from the entrance of any rain. If desired the covering may be made more tight by having the frame members of sufficient area whereby they may overlap, as shown in Figure 6.

These frame members may be inserted in place to cover plants and other materials to protect against early and late frosts, and then may be removed and stacked away until they are further needed, or the device may be made of a more permanent character and left permanently assembled, for it will be seen that when the device is in open position, full access to the sun's rays is permitted. Moreover, by positioning the window frames the light rays may be reflected upon the plants, thereby making it more effective to accelerate the plant growth than if the covering were not used.

The covering is not only adapted for these temporary structures, such as illustrated, but may also be advantageously adapted in a roof or wall cover for greenhouses and the like, and may there be also manipulated to open and closed position. A roof or wall structure may be made up entirely of said sections or they may be installed only to cover certain areas or certain portions of the roof or wall of said greenhouses or other similar building.

While I have described and shown embodiments in detail it will be understood that the detailed construction is for the purpose of illustration and not as a limitation of the invention, and that there may be various changes in detail without departing from the spirit of the invention.

I claim:

1. A device for protecting plants comprising two parallel rows of supporting columns with columns in the two rows opposite one another, separate frames each pivoted on opposite columns of the two rows, said frames each carrying a transparent panel and being each swingable from a position substantially in alignment with one another where they constitute a closure for the space between the two rows to an open position.

2. A device for protecting plants comprising two parallel rows of supporting columns with columns in the two rows opposite one another, separate frames each pivoted on opposite columns of the two rows, said frames being each swingable from a position substantially in alignment with one another where they constitute a closure for the space between the two rows to an open position, and means for simultaneously swinging all of the frames to their open and closed positions comprising arms secured to the respective panels at their pivots and extending substantially parallel to one another, and a connecting rod pivotally attached to all of said arms for simultaneously turning them.

3. A device for protecting plants comprising support elements, a covering composed of a series of frames each including a transparent panel and being pivoted approximately at the centers of its ends to said support elements and each being swingable in a direction common to all from a position substantially in alinement with one another where they constitute a closure for the space between the two rows to an open position.

4. A device for protecting plants comprising support elements, a covering composed of a series of frames each including a transparent panel and being pivoted approximately at the centers of its ends to said support elements and each being swingable in a direction common to all from a position substantially in alinement with one another where they constitute a closure for the space between the two rows to an open position, and means for operating said frames in unison comprising a relatively short crank lever associated with each frame and extending therefrom at such an angle as to be always on the same side of the plane of alinement of said frames, and a simple rod pivotally connected to all of said cranks.

5. A device for protecting plants over an extended area comprising spaced rows of supporting columns with the columns in adjacent rows opposite one another, separate frames each pivoted on opposite columns of adjacent rows and each carrying a transparent panel and the frames between adjacent rows each being swingable from a position substantially in alinement with one another where they constitute a substantially continuous cover for the space between said adjacent rows to an open position.

6. A device for protecting plants over an extended area comprising spaced rows of supporting columns with the columns in adjacent rows opposite one another, separate frames each pivoted on opposite columns of adjacent rows and the frames between adjacent rows each being swingable from a position substantially in alinement with one another where they constitute a substantially continuous cover for the space between said adjacent rows to an open position, and means for simultaneously swinging all of a series of adjacent frames to their open and closed positions comprising arms connected with respect to the frames at their pivots and extending substantially parallel with one another, and a connecting rod pivotally attached to all of said arms for simultaneously turning them.

7. A device for protecting plants comprising support elements, a covering composed of a series of frames each including a transparent panel and being pivoted approximately at the centers of its ends to said support elements and each being swingable from a position substantially in alinement with one another where they constitute a closure for the space between the two rows to an open position, the support elements comprising spaced posts and the spaces between said posts being substantially open.

ALBERT C. FISCHER.